United States Patent [19]

O'Brien et al.

[11] Patent Number: 5,576,830
[45] Date of Patent: Nov. 19, 1996

[54] POSITION SENSOR WITH HALF TONE OPTICAL GRADIENT WEDGE

[75] Inventors: Michael J. O'Brien, Rochester; Jeffrey R. Hawver, Henrietta; Andrea S. Rivers, Bloomfield, all of N.Y.

[73] Assignee: Eastman Kodak Company, Rochester, N.Y.

[21] Appl. No.: 447,872

[22] Filed: May 23, 1995

[51] Int. Cl.$^6$ ............................................. G01B 11/00
[52] U.S. Cl. ........................ 356/373; 356/375; 250/231.1
[58] Field of Search ................................. 356/373, 375; 250/214 PR, 231.1, 231.13, 231.18, 231.19; 359/888, 893

[56] References Cited

U.S. PATENT DOCUMENTS

| | | | |
|---|---|---|---|
| 4,769,667 | 9/1988 | Ishiguro et al. | 354/435 |
| 4,928,008 | 5/1990 | Huggins et al. | 356/373 |
| 4,989,032 | 1/1991 | Hull et al. | 255/38 |
| 5,325,142 | 6/1994 | Depatie et al. | 354/234.1 |

*Primary Examiner*—F. L. Evans
*Attorney, Agent, or Firm*—Francis H. Boos, Jr.

[57] ABSTRACT

A position sensor having an opto sensor and an optical density gradient wedge photo interrupter in which the gradient wedge comprises a half tone dot pattern preferably photographically reproduced in a photosensitive medium. In a preferred embodiment, the half tone dots are formed with microdots that are cumulated to increase the density of the half tone dots. In regions of density variations where the half tone dots change shape between round and square (in both solid fill and open fill dots), a random fill pattern is employed to enhance the linearity of the sensor output signal. The beam width of the opto sensor is uncollimated and focused to cover at least three pixel widths of the half tone dot pattern where each pixel is formed of at least four half tone dot areas.

5 Claims, 3 Drawing Sheets

POSITION SENSOR WITH HALF TONE OPTICAL GRADIENT WEDGE

FIELD OF THE INVENTION

The invention relates generally to the field of device position sensors, and in particular to the use of optical gradient wedge photo interrupters for feedback position control.

BACKGROUND OF THE INVENTION

Position sensors are well known for providing feedback control of electromechanical devices such as motors, camera shutters, iris diaphragms, zoom lenses and the like. Variable optical density photo interrupters, referred to herein as gradient wedges, are used with opto-sensors in such positions sensors to detect motion of a member such as a motor shaft or shutter blade to provide an output feedback signal for control purposes. An example of a position sensor and feedback control using an optical gradient wedge is described in commonly assigned U.S. Pat. No. 5,325,142-Depatie et al, the disclosure of which is incorporated herein by reference. Gradient wedges have typically comprised thin metallic films deposited on glass substrates or continuous tone images produced on photographic emulsion coated film stock. Both of these methods produce a wedge that is nonlinear, often non-monotonic and inconsistent from batch to batch. While deposited film wedges can be made accurately, they are generally very expensive to produce and, since they are deposited on glass substrates, they tend to be fragile and have relatively high inertia, a problem particularly in high speed servo control operation. Variable width apertures formed in opaque sheet material have also been described, however these wedges are also costly to produce with reliable repeatability and also suffer from high inertia.

It is therefore desirable to provide position sensors using optical gradient wedges that are easily and economically reproduced and that have good linear response characteristics. It is further desirable to provide such sensors with optical gradient wedges that are accurate and consistent between batches when produced in large quantities and can be produced on thin stock material that does not create high inertia difficulties.

SUMMARY OF THE INVENTION

In accordance with the invention therefore, there is provided a position sensor that comprises an opto-sensor having a light source and a photo sensor, the light source projecting a light beam onto the photo sensor. The position sensor also includes an optical gradient wedge photo interrupter translatable through the light beam between the light source and photosensor. According to a feature of the invention, the optical gradient wedge comprises a half tone dot pattern having a variable optical density. Such patterns can be readily produced with accurate repeatability using known computer graphic arts programs and can be printed on substrates for direct use or for use as masks in photographically reproducing the patterns on photosensitive materials. In a preferred form of the invention, the optical wedge density pattern ranges from a predetermined low optical density range through a predetermined middle optical density range to a predetermined high optical density range, the dot pattern of the low density range having a uniform center fill pattern, the middle density range having a random center weighted pattern and the high density range having a random edge weighted fill pattern. The use of random dot pattern fill for the transitions between density ranges has been found to markedly improve the linearity of the output signal derived from the position sensor.

DETAILED DESCRIPTION OF THE INVENTION

Figure 1:
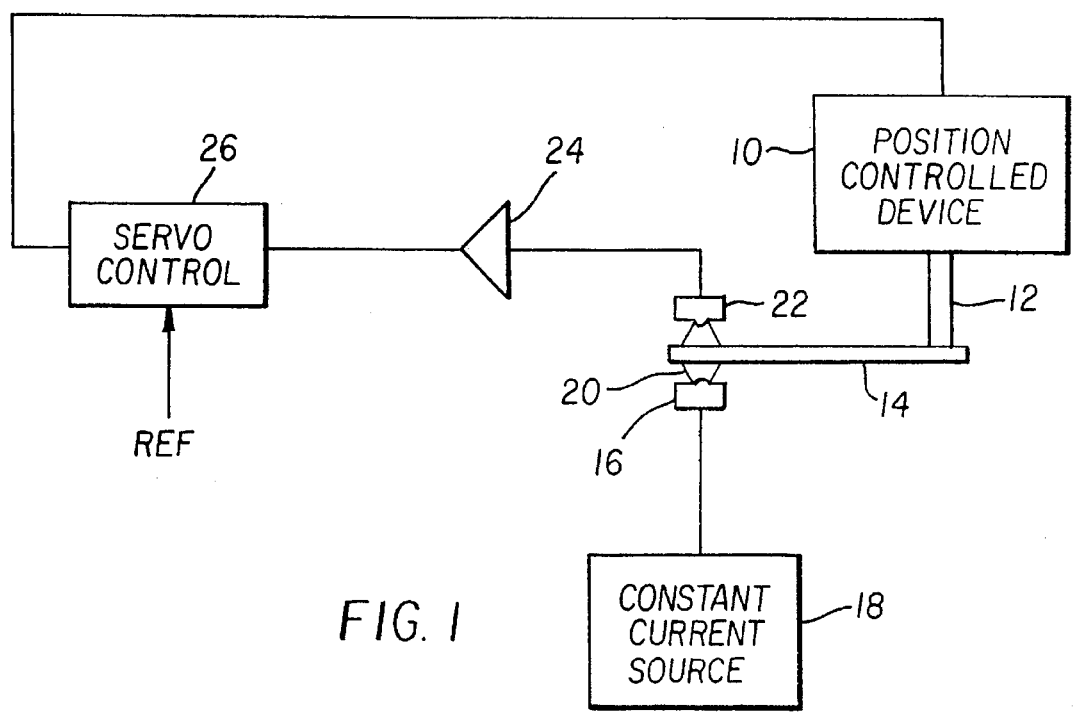
FIG. 1 is a simplified block diagram of a servo controlled system employing a position sensor employing a transmissive optical wedge in accordance with one aspect of the present invention.

In FIG. 1, there is shown a simple servo controlled system employing a position sensor according to the present invention in which 10 represents a device, such as a motor, camera shutter etc., whose position is to be sensed and controlled. In the illustrated embodiment, a transmissive optical gradient density wedge 14 is attached to a rotatable output shaft from the device 10. A light source 16 driven by a constant current source 18 provides a constant light output beam 20 which shines through the gradient wedge 14 and is intercepted by a photo sensor 22. The output of the photo sensor 22 is coupled via a signal conditioner 24 which converts the current output of the sensor 22 to a voltage signal which is then applied to a controller 26. Controller 26 is operative in known manner to compare the feedback voltage signal from signal conditioner 24 to a reference signal, REF, indicative of the desired position of shaft 12, and to generate a control voltage which is applied to the device 10 to control the position of shaft 12. The details of servo control are well known in the art and need not be described further.

Figure 2:
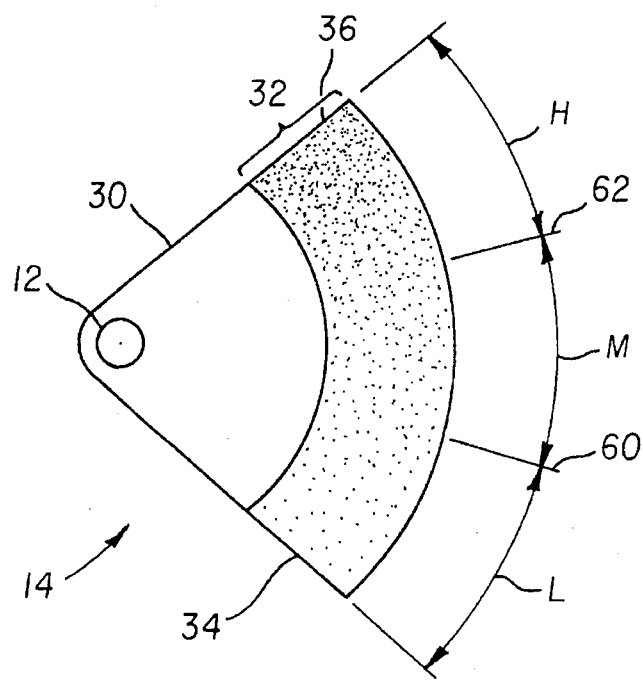
FIG. 2 is an illustration of an optical gradient wedge useful in the present invention.

An example optical gradient wedge 14 is shown in FIG. 2. The illustrated gradient wedge 14 is comprised of a transparent substrate 30 of mylar-based photographic material, preferably Estar thick base film material produced by Eastman Kodak Company, having a conventional high contrast photographic emulsion coated thereon. A peripheral area of the wedge 14 has a half tone dot pattern 32 preferably photographically produced thereon. The half tone dot pattern 32 has an optical density characteristic that varies along the arcuate length of the pattern in a predetermined manner. In a preferred form of the invention, the optical density varies in a uniform linear manner from a high optical density adjacent one end 34 to a low optical density adjacent the other end 36. For reasons that will become apparent subsequently, it is convenient to segregate the optical density variation into segments comprised of a range L of low density variations adjacent end 34, a high density range H adjacent opposite end 36 and an intermediate density range M.

Figure 3:
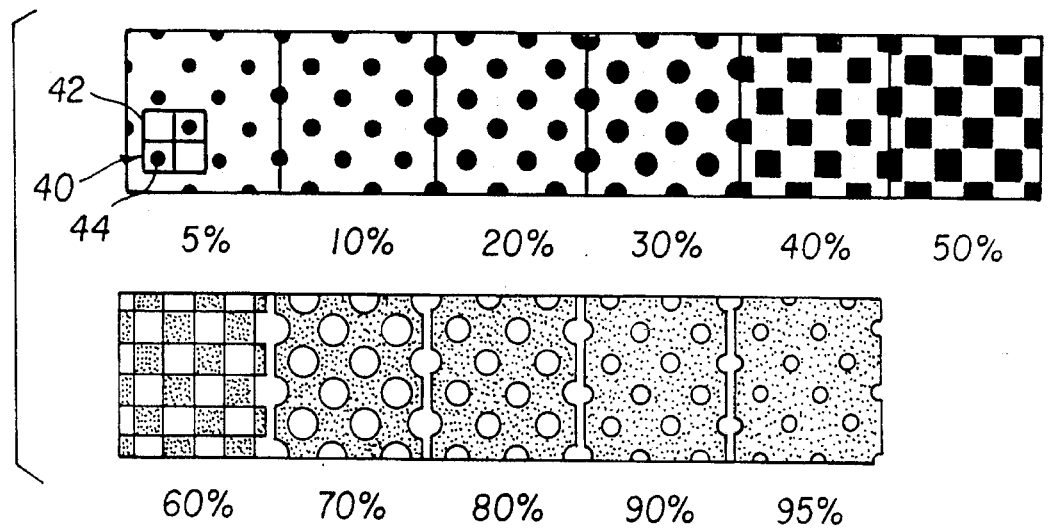
FIG. 3 is a diagrammatic illustration of a standard half tone dot pattern useful in one embodiment of the invention.

Referring to FIG. 3, there is shown a standard half tone dot pattern for a series of increasing percent fill pattern which correspond to progressively increasing optical densities. Each pixel 40 is made up of four half tone dot areas 42. The light source beam 20 is uncollimated, but is lightly focused to concentrate the beam width over a minimum of three pixel area widths to gain the benefit of optical averaging of the density of multiple pixel areas.

In a photographic optical wedge, optical density is achieved by exposing the photographic emulsion with a controlled dot-sized light to produce, after development, opaque dots 44 in the half tone dot areas 42. Variations in the optical density are achieved by progressively increasing the size of the dot exposures until, at maximum optical density, each half tone dot area 42 is covered, which corresponds to 100% fill of the pixel 40. It has been found that the use of an optical wedge with a half tone dot pattern for the variable density control area gives an unexpected improvement in consistency in optical wedge production over the use of continuous tone variable density areas. It has been found that when attempting to produce continuous tone wedges, the density of the processed emulsion is highly dependent on the DLogE characteristic of the photographic emulsion which can varies significantly from film to film and even over small areas of a single sheet of film. On the other hand, the binary light/dark nature of a half tone dot pattern does not rely on DLogE film characteristic to achieve desired density variations since the exposed areas are always driven to a fully exposed condition with the size of the exposed area (either the size of the dot exposure or the number of dots in a digital process) determining the resultant density characteristic. The use of half tone dot patterns produced in this manner assures consistent repeatability in high volume production of these photo interrupters. It also assures consistent linearity in the gradient pattern since the increasing size of the dot area can be easily controlled.

In a presently preferred form of the invention, a digitally generated half tone dot pattern, such as shown in FIG. 4, is employed in producing the optical wedge 14. Rather than using different sized light beams to expose the photographic emulsion, a digital photographic output scanner is employed to expose constant sized microdot areas 54, the number of exposed microdot areas in each half tone dot area 42 determines the optical density of the corresponding pixel 50. In the illustrated digital half tone pattern, each half tone dot area 52 is made up of a 10×10 matrix of microdot areas 54. With this format, if an industry standard 1800 dpi scanner is used to expose the half tone dot pattern onto the wedge 14, the resultant half tone dot resolution would then be 180 dpi.

Figures 4A, 4B:
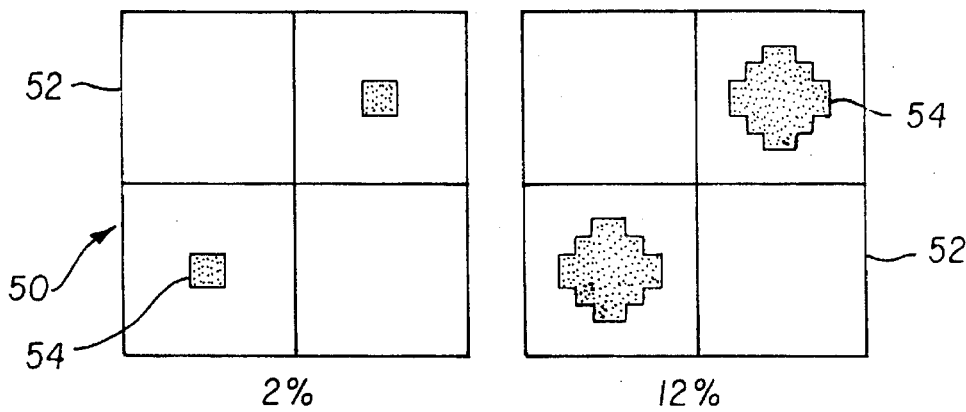
FIG. 4A–4B are diagrammatic illustrations of a modified half tone dot pattern useful in an alternative embodiment of the present invention.
Figures 4C, 4D:
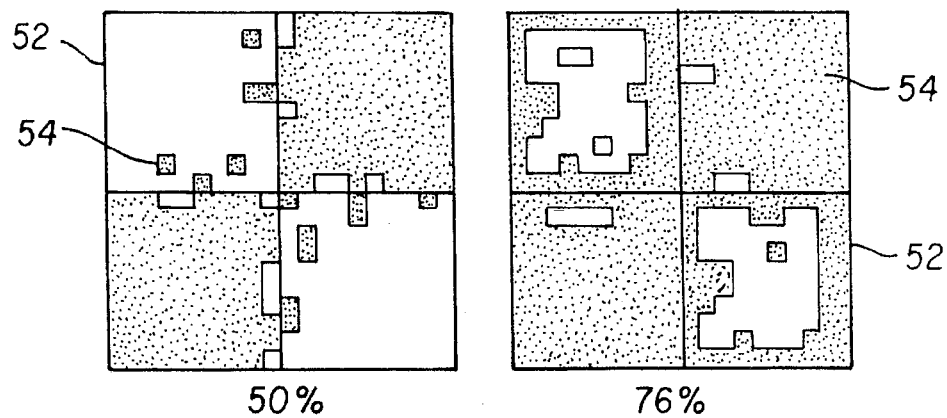

While achieving consistency in the high volume production of gradient wedges by the use of half tone dot patterns is highly desirable, it has been found that additional improvement in optical characteristics of the wedge (e.g., linearity, monotonicity) can be achieved by the use of digital printing techniques to produce a gradient wedge with modified half tone dot fill structures in different optical density ranges in the gradient wedge. Referring jointly to FIGS. 2 and 4, a digital photographic output scanner is used to produce a sequence of gradient density ranges L, M and H in which the different dot pattern fill structures are used in each of the ranges. Specifically, in the low density range L, a uniform center fill pattern is used in which microdots 54 are clustered contiguously in the center of the half tone dot areas 52 as shown in FIGS. 4a and 4b, with the average optical density of the pattern being determined by the number of microdots exposed in each half tone dot area. As the percent fill of the half tone dot areas 52 increases, with corresponding increase in optical density, a point 60 is reached at which the microdot fill pattern is changed over to a random center weighted fill pattern in which the addition of microdots is randomly placed in each dot area with the majority of the added microdots 54 being clustered about the center of the dot area 52 as shown in FIG. 4c. With increased fill of the half tone dot areas 52 beyond point 62 in the wedge, the dot pattern is changed to a random edge weighted pattern in which the added microdots 54 are randomly placed in the remaining open half tone dot areas 52 with the majority of the microdots being placed contiguously around the periphery of the half tone dot areas.

Figure 5:
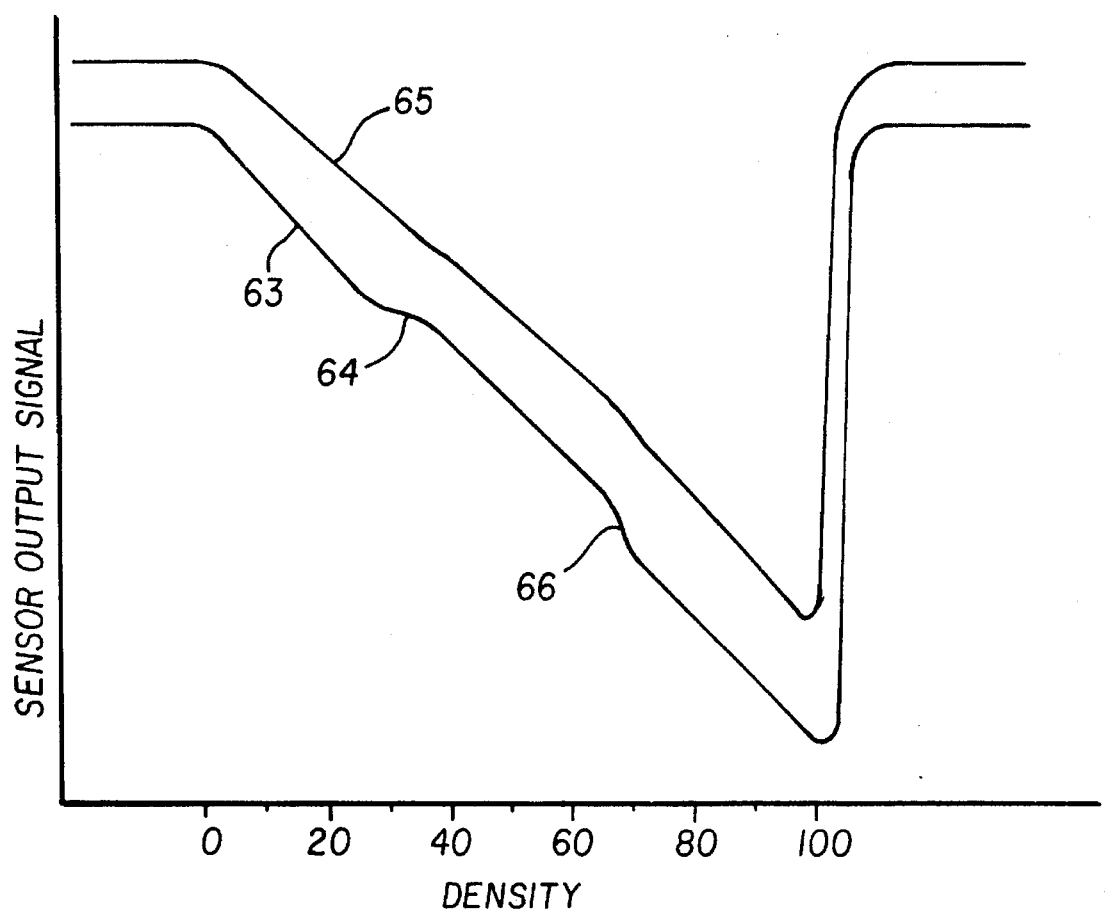
FIG. 5 is a graph showing comparative sensor output voltage responses for sensors using standard half tone dot patterns of FIG. 3 versus a position sensor using the modified half tone dot pattern of FIG. 4.

It has been found that when using a standard half tone dot pattern structure for the gradient wedge, a non-linearity in the output voltage from the photo detector 22 occurs, as seen in curve 63 of FIG. 5 at regions 64 and 66. These regions correspond to critical dot pattern transitions where the growing dot pattern changes from a generally round dot to a generally square shape and again where the gradual filling in of the open dot shape reverts from a generally square to a generally round condition. These conditions can be seen in FIG. 3 between the 30% and 40% fill patterns where the dot pattern changes from round to square and between the 60% and 70% fill patterns where the open dot shape changes from square to round. It was found unexpectedly that the use of a random fill pattern in these transition regions causes the nonlinearities to be smoothed out as seen in curve 65 of FIG. 5. It is believed that this smoothing function occurs as a result of the optical averaging that occurs as the photo detector scans across the pixels in the gradient wedge. The shape of the dot area is believed to have an effect on the output signal voltage on a micro scale. For a given area, the squares will block more light than the circles for a given density within a half tone dot area. Using a computer generated half tone dot pattern in which the density variations are created by accumulating microdots in each dot area allows the changeover from uniform to random fill patterns in which the randomness of the shape produces a smoothing function that results in a more linear output voltage.

Figure 6:
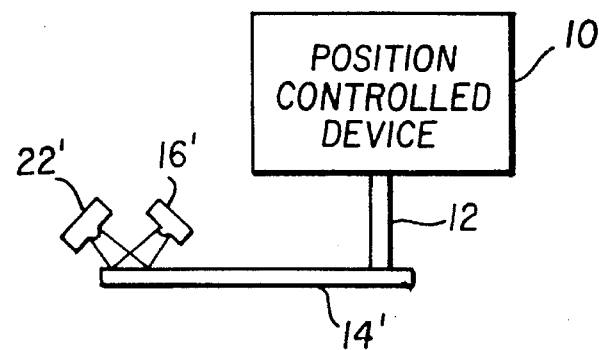
FIG. 6 is another embodiment of the position sensor of the present invention employing a reflective optical wedge.

For the sensor arrangement shown in FIG. 1, a transmissive photo interrupter optical gradient wedge is employed. The same results may be achieved using a reflective photo interrupter optical gradient wedge as shown in FIG. 6. In this arrangement, the reflective optical gradient wedge photo interrupter 14' can be prepared by printing of the desired half tone dot pattern on a reflective substrate and a reflective opto sensor 16',22' used to generate the position feedback signal. For high volume production of the gradient wedge, a negative mask may be produced by computer printing techniques which is then used to contact print the pattern onto reflective print paper stock.

The invention has been described with reference to a preferred embodiment. However, it will be appreciated that variations and modifications can be effected by a person of ordinary skill in the art without departing from the scope of the invention.

PARTS LIST 10 position controlled device
12 device shaft
14 optical gradient wedge photo interrupter
16 LED light source
20 light beam
22 photo sensor 24 signal conditioning circuit
26 servo control
30 transparent substrate
32 half tone dot pattern
34,36 ends of half tone dot pattern
H,M,L high, medium and low pattern density ranges
40 pixel of half tone dot pattern
42 half tone dot areas
44 opaque dots
50 pattern pixel
52 half tone dot areas
54 microdot areas

What is claimed is:

1. Position sensor comprising:

an opto-sensor having a light source and a photo sensor forming an optical beam therebetween;

an optical gradient wedge photo interrupter translatable between said light source and photosensor, the optical gradient wedge comprising a half tone dot pattern having a variable optical density the optical density of the half tone dot pattern varies from a predetermined low density range through a predetermined middle optical density range to a predetermined high optical density range, the dot pattern of the low density range having a uniform center fill pattern, the middle density range having a random center weighted pattern and the high density range having a random edge weighted pattern.

2. The position sensor of claim 1 wherein said half tone dots are each comprised of a plurality of microdots.

3. The position sensor of claim 1 wherein transition between said low and middle optical density ranges is in a range of about 30% to 40% area fill of half tone dots and transition between said middle and high optical density ranges is in a range of about 60% to 70% area fill of half tone dots.

4. The position sensor of claim 1 wherein said half tone dot pattern is photographically reproduced on a photosensitive medium.

5. The position sensor of claim 4 wherein said photosensitive medium is photographic film stock.

* * * * *